(12) United States Patent
Marchildon et al.

(10) Patent No.: US 6,201,096 B1
(45) Date of Patent: *Mar. 13, 2001

(54) CONTINUOUS POLYMERIZATION PROCESS FOR PREPARING POLYAMIDES FROM OMEGA-AMINONITRILES

(75) Inventors: Ernest Keith Marchildon; Ahmut Turgut Mutel, both of Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/426,021

(22) Filed: Oct. 25, 1999

Related U.S. Application Data (60) Provisional application No. 60/105,656, filed on Oct. 26, 1998.

(51) Int. Cl.[7] .................................................. C08G 69/28
(52) U.S. Cl. ......................... 528/310; 528/322; 528/323; 528/328; 528/332; 528/336; 528/362; 528/363
(58) Field of Search ..................................... 528/310, 328, 528/332, 322, 323, 336, 362, 363

(56) References Cited

U.S. PATENT DOCUMENTS

| | | | | |
|---|---|---|---|---|
| 2,241,323 | * | 5/1941 | Greenwalt | 528/335 |
| 4,354,020 | * | 10/1982 | Rotzoll et al. | 528/323 |
| 4,568,736 | * | 2/1986 | Curatolo et al. | 528/313 |
| 4,629,776 | * | 12/1986 | Curatolo et al. | 528/313 |
| 5,109,104 | * | 4/1992 | Marks | 528/313 |
| 5,185,427 | * | 2/1993 | Marks | 528/329.1 |
| 5,674,974 | * | 10/1997 | Brearley et al. | 528/340 |
| 6,069,228 | * | 5/2000 | Alsop et al. | 528/310 |
| 6,103,863 | * | 8/2000 | Hayes et al. | 528/332 |

FOREIGN PATENT DOCUMENTS

WO 98/08889  *  3/1998  (WO) .

* cited by examiner

*Primary Examiner*—P. Hampton-Hightower (57) ABSTRACT

A continuous process for the polymerization of omega-aminonitriles (e.g., 6-aminocapronitriles) which is introduced at the top of a vertical multistage reactor being swept countercurrently with steam and polyamide (e.g., nylon 6) is recovered near the bottom of the vertical multistage reactor. By virtue of independent temperature control at each of the vertical stages of the multistage reactor, the polyamide recovered is typically characterized as having unreacted nitrile end groups of less than 20 gram equivalents per million grams of polyamide, and less than 25 gram equivalents of secondary amine branching per million grams of polyamide.

6 Claims, 5 Drawing Sheets

CONTINUOUS POLYMERIZATION PROCESS FOR PREPARING POLYAMIDES FROM OMEGA-AMINONITRILES

CROSS-REFERENCE TO RELATED APPLICATIONS

Applicants claim the benefit of priority to provisional application No. 60/105,656 filed Oct. 26, 1998.

STATEMENT REGARDING FEDERALLY SPONSORED RESEARCH OR DEVELOPMENT

"Not Applicable"

BACKGROUND OF THE INVENTION

1. Field of the Invention

This invention relates to a process for the preparation of polyamides. More specifically, the invention relates to a continuous process for preparing polyamides by reaction of omega-aminonitriles in a countercurrent multistage reactor swept with steam.

2. Description of the Prior Art

Polyamides are conventionally prepared by the condensation polymerization of a diacid, such as adipic acid, and a diamine such as hexamethylene diamine, or by the polymerization of lactams such as $\epsilon$-caprolactam. Other processes are known which involve preparation of polyamides by reaction of omega-aminonitriles with water. For example, Greenwalt U.S. Pat. No. 2,245,129 discloses preparation of polyamides by heating omega-aminonitriles in the presence of water in a two step process. In the first step, the reaction mixture is heated in a closed reaction vessel to form a low molecular weight polyamide. In the second step, the liberated ammonia and excess water is removed at atmospheric or reduced pressure with simultaneous and/or subsequent heating of the polyamide to increase the molecular weight of the polyamide. Curatolo et al. U.S. Pat. No. 4,568,736 discloses using oxygen-containing phosphorus compounds as catalysts during the reaction of omega-aminonitriles to form polyamides. Marks U.S. Pat. No. 5,109,104 discloses the batch polymerization of omega-aminonitriles to produce high quality polyamides. In international patent application PCT/EP/97/0460. corresponding to international publication number WO 98/0889. a process for producing a polyamide by reacting an aminonitrile with water at sequential staged temperatures and staged pressures is disclosed. It is also known to produce polyamide within a continuous reactive distillation column involving significant rectification of an aqueous salt solution of a diamine and dicarboxylic acid as disclosed for example in U.S. Pat. No. 3,900,480. In a recent international patent application PCT/EP/98/08239, corresponding to international publication number WO 99/43732 published after the priority date of the present application, the reaction of an aminonitrile with water by reactive distillation is taught.

Most of the processes that have been disclosed in the art have been batch, with attendant potential disadvantages of high operating labor, within-batch final product non-uniformity, and batch-to-batch product non-uniformity. The current invention provides a continuous process for preparing polyamides from omega-aminonitriles which overcomes these problems.

BRIEF SUMMARY OF THE INVENTION

In view of the above, the present invention provides a continuous process for the manufacture of polyamide from omega-aminonitrile in a vertical counter-current multistage reactor wherein temperature control for individual stages is critical to achieve a usable product efficiently. More specifically, the polyamide capable of making useful product (i.e. polyamide prepolymer capable of ultimately producing a number average molecular weights in excess of 14,000) is characterized for purposes of this invention as containing unreacted nitrile end groups of less than 20 gram equivalents terminal nitrile per million grams of polyamide. Furthermore, the polymeric linearity of useful polyamide is characterized as containing less than 25 and preferably less than 10 gram equivalents of secondary amino branching per million grams of polyamide.

In order to achieve the production of commercially useful product efficiently in a continuous counter-current reactor operation, it has now been discovered that the temperature profile along the vertical column and the reactor pressure must be controlled. More specifically, the selection of reactor conditions (particularly of the top stages of the reactor) must assist in the absorption of volatile starting reactants and simultaneously minimize their loss in the exit steam of volatile by-products. Furthermore, the selection and control of the reactor conditions must assist in directing of the counter-current flow of volatile by-products to the upstream part of the process where they are less likely to chemically limit or reverse the polymerization reaction.

Both of these benefits are partially realized in the process of the present invention, for example in the case where a catalyst is added to the liquid feed stream, by virtue of the temperature of at least one top stage of the reactor being maintained between 190 to 220° C., the temperature of at least one bottom stage of the reactor being maintained between 260 to 290° C. and the pressure being maintained between 100 and 300 psig. In the case where no catalyst is added to the liquid feed stream the temperature of at least one top stage of the reactor is to be maintained between 230 to 250° C., the temperature of at least one bottom stage of the reactor is maintained between 260 to 290° C. and the pressure is maintained between 400 and 800 psig. In furtherance of the above, the discrete stages of the present invention provide locations where heat can be readily supplied or removed in order to control stage temperature and composition. A preferred temperature profile along the column involves the top stage temperature being 2 to 10° C., most preferably 5° C., hotter than the temperature corresponding to a partial pressure at which the pressure of pure stream is numerically equal to the operating pressure of the reactor. Simultaneously, the lower stages of the reactor for this preferred temperatures profile involve maintaining a temperature between 260 and 290° C., preferably about 270° C.

Thus, the present invention provides a continuous process for the manufacture of polyamide from omega-aminonitrile comprising the steps of:

a) providing a vertical countercurrent multistage reactor, the reactor being equipped with internal perforated barrier means for establishing a plurality of stages and for effecting contact of countercurrently flowing omega-aminonitrile stream and steam vapor stream;

b) introducing an omega-aminonitrile reactant stream near the top of the vertical countercurrent multistage reactor;

c) introducing a steam vapor containing stream near the bottom of the vertical countercurrent multistage reactor;

d) maintaining the temperatures and the pressure within the vertical countercurrent multistage reactor sufficiently high to achieve hydrolysis of the omega-aminonitrile in the upper stages of the reactor without excessive volatilization and simultaneously sufficiently high to achieve polymerization in the lower stages of the reactor without excessive degradation;

e) withdrawing a steam and ammonia containing stream overhead of the vertical countercurrent multistage reactor; and f) recovering a polyamide containing product stream from the bottom of the vertical countercurrent multistage reactor, wherein said polyamide is characterized as having unreacted nitrile end groups of less than 20 gram equivalents per million grams of polyamide.

Preferably, the linearity of the polyamide being recovered is further characterized as containing less than 25 gram equivalents of secondary amine branching per million grams of polyamide, and most preferably less than 10 gram equivalents of secondary amine branching per million grams of polyamide.

The present invention further provides one preferred embodiment of the process wherein the manufacture of polyamide from omega-aminonitrile is performed in the presence of catalyst and wherein the temperature of at least one top stage of the reactor is maintained between 190 to 220° C., the temperature of at least one bottom stage of the reactor is maintained between 260 to 290° C. and the pressure is maintained between 100 and 300 psig and wherein polymeric linearity of the polyamide being recovered is further characterized as containing less than 10 gram equivalents of secondary amine branching per million grams of polyamide.

The present invention provides another preferred embodiment of the process wherein the manufacture of polyamide from omega-aminonitrile is performed in the absence of catalyst and wherein the temperature of at least one top stage of the reactor is maintained between 230 and 250° C., the temperature of at least one bottom stage of the reactor is maintained between 260 and 290° C. and the pressure is maintained between 400 and 800 psig.

DETAILED DESCRIPTION OF INVENTION

The process of the current invention is a continuous process for preparing polyamides by reaction of omega-aminonitriles in a countercurrent multistage column reactor. The omega-aminonitrile is hydrolyzed by reacting with dissolved water which is supplied and replenished by steam flowing countercurrently to the direction of flow of the omega-aminonitriles and subsequent reaction products, and polymerized under the operating conditions of the column to form a polyamide.

A solution of omega-aminonitrile is fed continuously near the top of a multistage column reactor. The feed is preferably pure omega-aminonitrile or an aqueous solution, containing preferably between about 80 and 95 weight percent omega-aminonitrile. The omega-aminonitrile feed is supplied to the column at a temperature that most facilitates the establishment and maintenance of the desired temperatures in the column, the feed temperature generally lying between the temperature required to keep the feed substantially in the molten state (i.e. where it is capable of being pumped) and the temperature of the liquid within the column at the point of entry. Saturated steam, or steam containing a small amount of water, or superheated steam at a temperature up to about that of the liquid within the reactor at the point where the steam enters, is fed continuously to one or more of the lower stages of the column reactor at a weight flow rate (lb/hr) that is at least 30 percent of and preferably approximately equal to the weight flow rate of the feed.

The feed optionally includes a catalyst. Oxygen-containing phosphorus compounds such as those disclosed in Curatolo et al. U.S. Pat. No. 4,568,736 are preferred. For example, phosphorous acid, phosphonic acid, alkyl and aryl substituted phosphonic acid, hypophosphorous acid, phosphoric acid, mixtures thereof and the like can be used. Any phosphorus compound that hydrolyzes to an oxygenated phosphorus acid or a salt during the reaction is also useful. The oxygen-containing phosphorus catalysts are typically added at a weight percent, relative to the omega-aminonitrile, of 0.05 to 0.3, preferably 0.1 to 0.2. Preferred catalysts include phosphoric acid, phosphorous acid, phenyl phosphinic acid, and 2-(2'-pyridyl) ethyl phosphonic acid.

Omega-aminonitriles which can be used in the process of the current invention are those described in Curatolo et al. U.S. Pat. No. 4,568,736 and have the formula;

where R is a divalent organic radical and R' is hydrogen or a univalent organic radical. Preferred compounds are omega-aminoalkylnitriles where R is a linear aliphatic radical and R' is hydrogen or a linear aliphatic radical and where the omega-aminoalkylnitrile has 6 to 12 carbon atoms. Representative omega-aminonitriles include 6-aminocapronitrile, 12-aminolauronitrile, 3-aminopropionitrile, and 4-cyanoaniline. In a preferred embodiment, the omega-aminonitrile is 6-aminocapronitrile. In the process of the current invention, it is necessary that the omega-aminonitrile be fully or largely soluble in the liquid within the column reactor under the conditions of temperature, pressure and liquid composition existing in the column reactor and fully soluble under the conditions in the bottom one-third of the reactor.

The omega-aminonitrile feed can include a mixture of omega-aminonitriles as well as of other polyamide-forming monomers which will react with the omega-aminonitrile. Among such monomers are those which, each within itself, possess amide-forming capability, such as lactams, aminoalkylamides and aminoacids. They may be included in any ratio to the omega-aminonitriles. Examples are caprolactam, 6-aminocaproamide, and 6-aminocaproic acid. Another class of monomers are those which must be added in combination with other monomers in order to form amide links. Such monomers are diacids, diamines, diamides and dinitriles. They may be included singly in small amounts, generally no more than about 50 gram-moles per million grams of final polymer, in order to achieve a desired difference between carboxyl and amine ends. They may be included as stoichiometrically-balanced pairs of complementary functionality in any ratio to the omega-aminonitriles. Examples are adipic acid, hexamethylene diamine, adipamide, and adiponitrile. These other components can be added as a liquid or as a solid slurried in with the omega-aminonitrile. All of the components should be fully or largely soluble in the column reactor under the conditions of temperature, pressure, and liquid composition within the column and fully soluble under conditions in the bottom one-third of the reactor.

The process of the current invention is especially useful when a major portion of the feed comprises compounds containing nitrile groups. The feed can also include a fraction of polyamide prepolymer. For example a portion of the prepolymer formed in the process of the current invention can be recycled with the feed. This portion is typically the pre-polymeric material removed from the polymer in subsequent processing, for example by volatilization or by liquid extraction, comprising up to about 10 weight percent of the product stream. A larger amount could be handled. Inclusion of this material reduces the productive capacity of the column reactor.

Standard distillation columns are suitable for use in the process of the current invention if the residence times in the stages is increased to give sufficient time for hydrolysis of the nitrile groups. The required liquid residence time in the reactor is between about one hour and four hours to achieve a sufficient extent of nitrile hydrolysis.

Figures 1, 2:
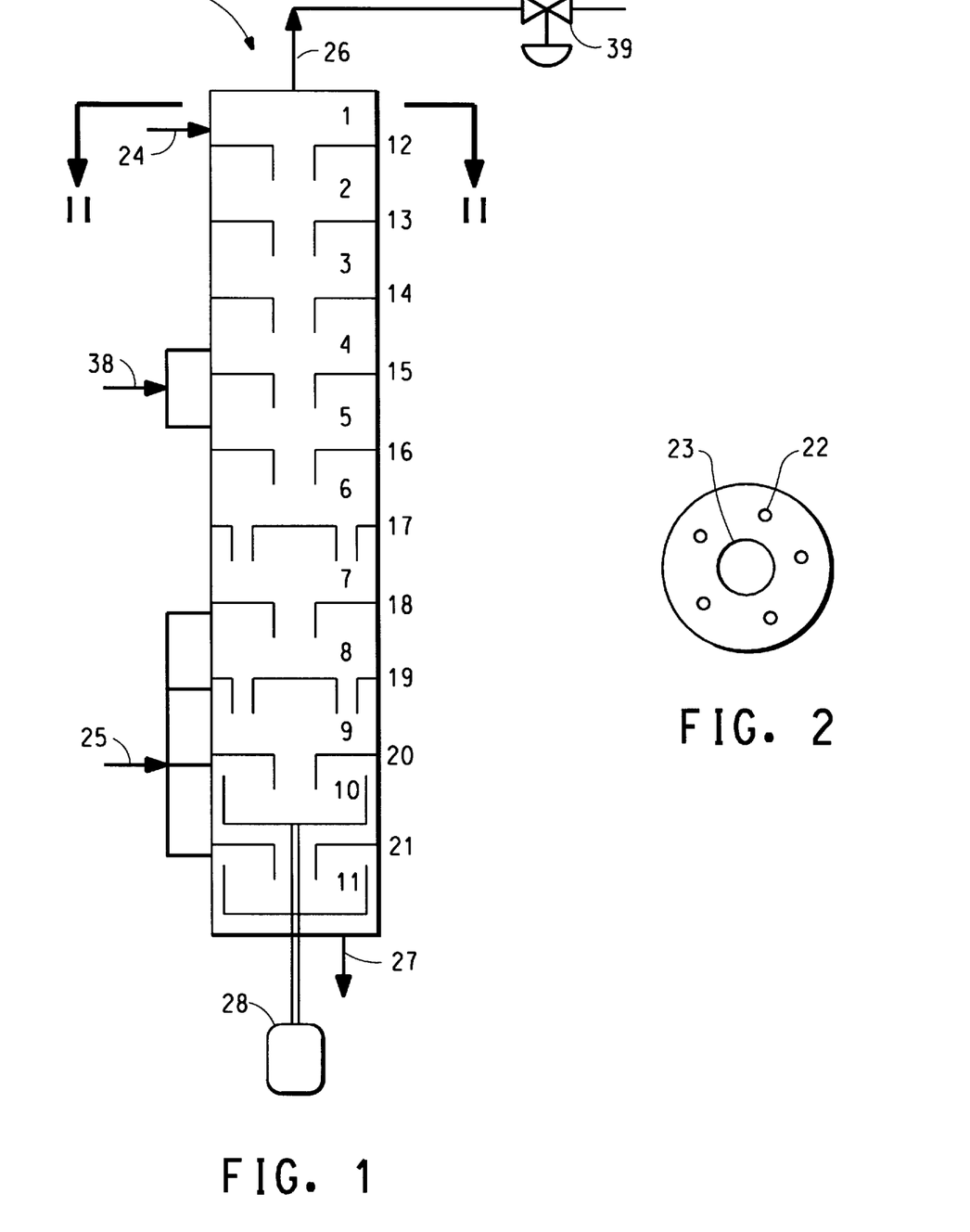
FIG. 1 is a schematic cross-sectional side-view of one embodiment of a vertical multistage reactor useful for performing the continuous polymerization process according to the instant invention. The reactor is divided into discrete stages 1–11 using perforated barriers 12–21
FIG. 2 is a cross-sectional view of the vertical multistage reactor of FIG. 1 as seen through lines II—II.

The column reactor is equipped with internals, such as but not limited to perforated plates and agitators, so as to cause effective staged contact of the countercurrently flowing steam with the liquid reaction mixture to ensure substantially complete hydrolysis of the nitrile groups and removal of ammonia generated by chemical reaction. As illustrated in FIG. 1, the internal configuration of a multistage reactor, generally designated by the number 100, suitable for use in the current invention is divided into discrete stages 1–11 using perforated barriers 12–21 between the stages. The barriers, see FIG. 2, include small perforations 22 which allow the vapor to flow upward from stage to stage, and a larger downcomer tube 23 which leads from each stage into and below the surface of the reaction mixture in the stage below, allowing the liquid to flow downward from stage to stage. The number of stages is chosen to achieve a high rate, per unit of liquid volume, of mass transfer and chemical reaction. Five to fifteen stages are a typical range.

Figure 3:
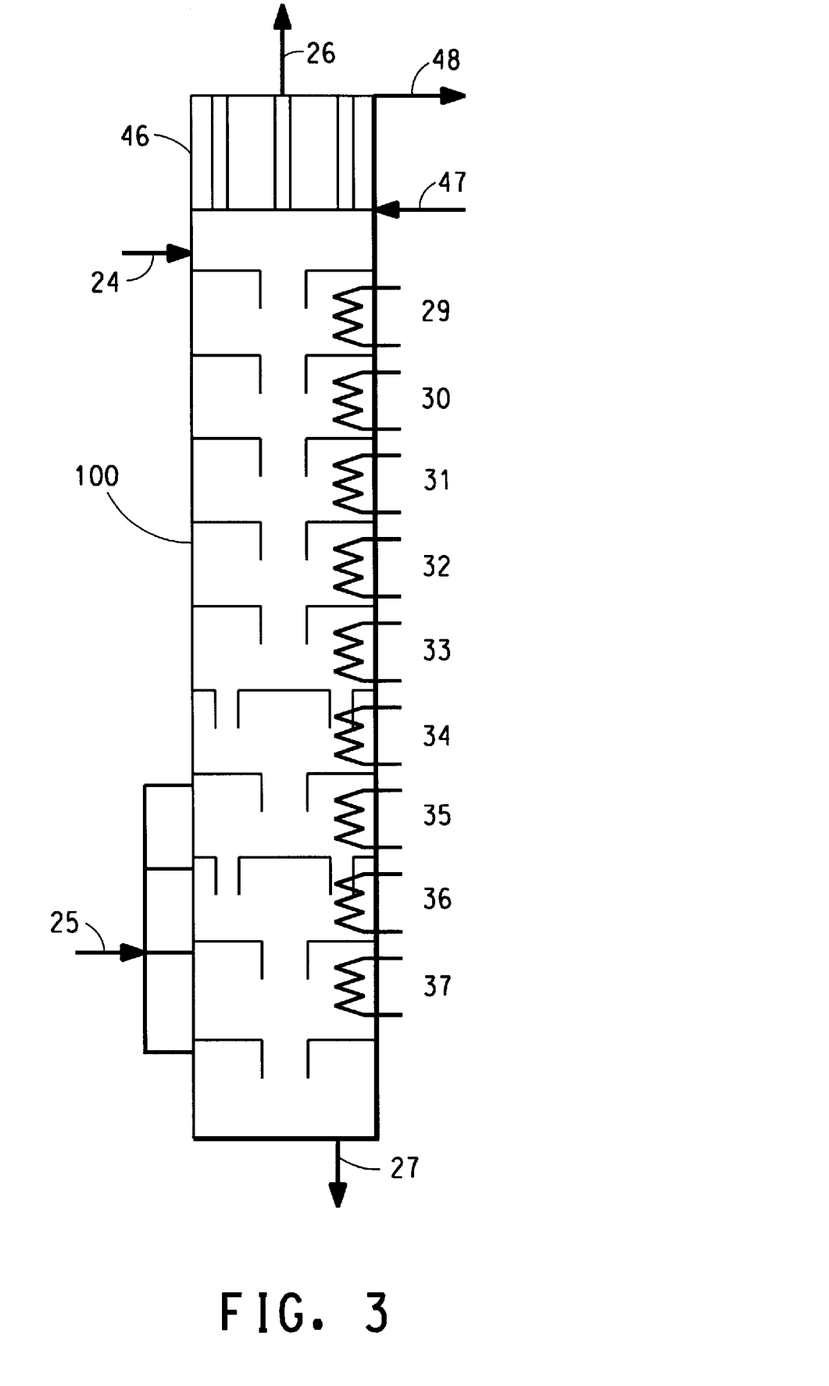
FIG. 3 is a schematic cross-sectional side-view of a vertical multistage reactor illustrating the presence of an independent heating element 29–37 at each reactor stage and the presence of a partial condenser at the top of the column.

The omega-aminonitrile feed 24 is fed continuously near the top of the multistage column reactor 100 and steam 25 is fed continuously to one or more of the bottom most stages of the reactor. The steam can be saturated steam, or steam containing a small amount of water, or superheated steam, with superheated steam being preferred in order to minimize the heating requirement within the reactor. Steam and ammonia vapor are removed at the top of the column as vapor stream 26. Polyamide product 27 is continuously removed from the bottom stage 11. The column preferably includes means to separate and return to the column any omega-aminonitrile and/or lactam which leaves the top part of the column as a vapor or as an entrained liquid. One such means is a partial condenser 46 (see FIG. 3) at the top of the column. By means of manipulating the flow and temperature of cooling fluid into 47 and out of 48 the cooling side of the partial condenser, the condenser 46 is maintained at a temperature sufficient to condense and return most of the omega-aminonitrile and/or lactam to the column while allowing steam and ammonia to be removed in vapor stream 26. Additionally, one or more stages can be added to the column reactor above the feed stage and a partial condenser can be provided above the uppermost of these stages to provide reflux liquid.

The temperature in the column is maintained sufficiently high that the reaction mixture does not freeze. The temperature at the top stage 1 of the column is maintained at a lower temperature than the temperature at the bottom stage 11. The top temperature is maintained at a temperature that is high enough to achieve a good rate of hydrolysis of the omega-aminonitrile and still avoid excessive volatilization of omega-aminonitriles and/or lactams. It is possible to use a combination of choice of upper stage temperature and a partial condenser to minimize outflow of these two reactants. The temperature of bottom stage 11 is adjusted high enough to obtain adequate polymerization rate but not so high as to obtain degradation. For example, secondary amines can form when amine ends condense with each other. Secondary amines are undesirable because they create branch points in the polymer and loss of desirable properties in use. The potential for forming secondary amines exists throughout the column; therefore it is important that the average temperature in the stages not exceed a value above which the formation of secondary amines becomes detrimental to the product. Averaging over the bottom two-thirds of the reactor, this temperature is approximately 275° C. Because the hydrolysis reaction is exothermic, the column is optionally equipped with means for water injection 38 at all or selected stages for temperature control. When the feed comprises 6-aminocapronitrile, the top stage is preferably maintained between about 190° C. and 220° C. with catalyst and between 230 and 250° C. without catalyst and the bottom stage is preferably operated between about 275° C. and 290° C. All or most stages are preferably equipped with means for independent control of temperature. This control is best accomplished by use of a hot flowing liquid heat transfer medium passing through jackets, coils, or other heat-transfer devices 29–37 (see FIG. 3), which can be used for both heating and cooling.

The column is operated at elevated pressure, preferably above 50 psig, more preferably 100 to 300 psig with catalyst and 400 to 800 psig without catalyst to obtain substantially complete hydrolysis of the nitrile ends in the omega-aminonitrile, which is required to obtain good quality polymer. The product should preferably contain no more than about 10 to 20 gram-equivalents per million grams of polymer of un-hydrolyzed nitrile ends, in order to be capable of being subsequently readily raised to the highest average molecular weight required for a particular end use. The pressure can be controlled by means of a pressure control valve 39. the opening of which is continuously adjusted to vary the outflow of vapor stream 26 in response to the measured pressure in the vessel. Under the conditions of temperature and of the concentration of water, amine functional groups and catalyst in the reactor, the nitrile ends are largely converted, in combination with amine functional groups, into amide linkages, with consumption of water and release of ammonia. The ammonia is removed from the reactor in vapor stream 26.

One of the advantages of the process of the invention is that the countercurrent operation of the column results in continual flushing, by steam, of ammonia away from the lower parts of the reactor up through the upper parts and out the top exit vapor stream. It is important to minimize the concentration of ammonia in the lower part of the column for two reasons: ammonia reacts with and breaks amide linkages, hence limiting the growth of polymer molecular weight, and ammonia in the vapor reduces the partial pressure of steam in the vapor and hence the concentration of water dissolved in the liquid, which reduces the rate of nitrile hydrolysis. These two effects would be especially damaging in the lower part of the reactor, where amide linkages are highest and where the rate of nitrile hydrolysis is already slow because few nitrile ends are left. Similar flushing of ammonia is accomplished in batch processing by introducing dissolved water into the initial reaction mixture and by injecting steam or water into the mixture during the course of the reaction. Similar flushing of ammonia can be accomplished in a co-current continuous process, where vapor and liquid move in the same direction, but in this case large amounts of steam must be used in order to dilute the ammonia sufficiently to attain adequate molecular weight and adequate hydrolysis of nitrile ends.

In the upper stages of the column, the viscosity of the reaction mixture is low enough that with appropriate design of the perforated barriers 12–21. gas bubbles from the steam and ammonia vapor result in effective mixing in the reaction mixture. At the bottom of the column, where the viscosity is highest, a mixer 28 is preferably used in one or more of the bottom most stages in the reactor. In the reactor shown in FIG. 1, mechanical mixing is provided in the bottom two stages.

Preferably, mixing in each stage is to be influenced by either proper arrangement of coils to assist gas induced mixing or by mechanical agitation in lower stages where gas mixing is not sufficient due to high viscosities to minimize liquid by-pass between the stages. Liquid by-pass reduces the desired reaction efficiency resulting in either a larger size reactor to achieve the same conversion at a given flow rate and/or increased ratio of side reactions to preferred reaction resulting in quality problems. Height-to-diameter ratio for each stage is preferably between 0.5 to 1.2 to achieve the desired mixing efficiency.

Axial mixing between the stages in the column reactor as a result of liquid backflow through the downcomers induced by large bubbles either entering the downcomers or forcing liquid into the downcomers as they approach the downcomers will reduce the overall nitrile conversion efficiency in the column reactor. This will result in either a larger size reactor to achieve the same conversion at a given flow rate and/or increased ratio of side reactions to preferred reaction resulting in quality problems. Following preferred arrangements of downcomers is employed in this column reactor.

Figure 6:
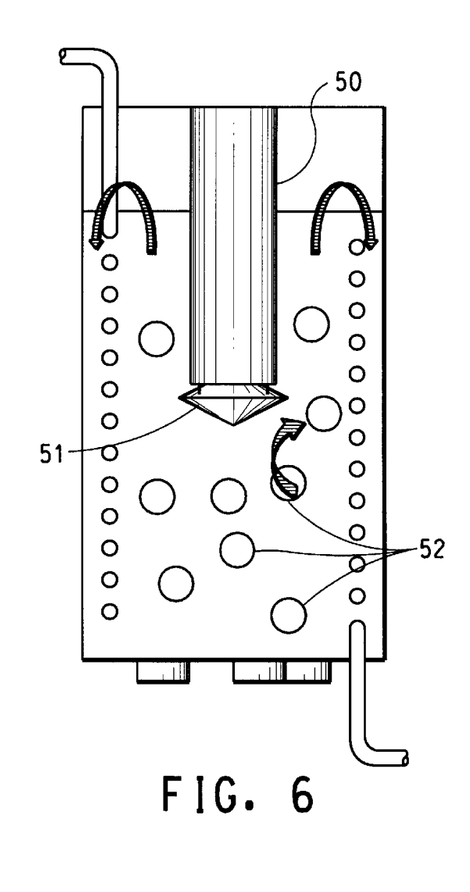
FIG. 6 is a schematic cross-section side-view of a reactor stage containing a circular central downcomer having a bi-conical attachment at the bottom to deflect the gas bubbles.

As illustrated in FIG. 6, the circular central downcomer 50 preferably has a bi-conical attachment 51 at the bottom to deflect the gas bubbles 52 away from the downcomer and prevent gas bubbles entering the downcomer, as well as deflecting the liquid exiting the downcomer. The gap between the attachment 51 and the bottom of the downcomer 50 is critical to minimize liquid backflow in the downcomer induced by the pressure field created by the gas bubbles travelling near the downcomer exit. The gap is adjusted such that the pressure drop created by liquid flow is between 0.5 to 1.0 inches of liquid.

Figure 7:
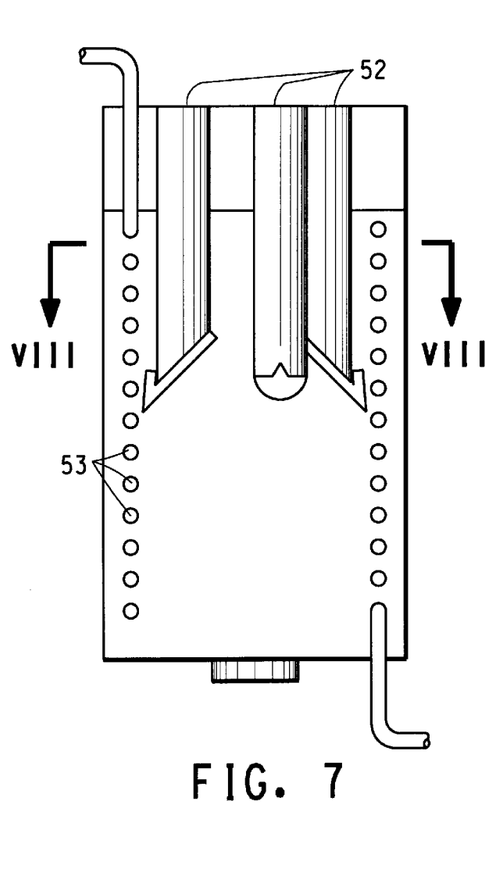
FIG. 7 is a schematic cross-section side-view of a reactor stage containing multiple downcomers arranged in a triangular pattern wherein each downcomer is truncated at an angle with an extended ellipsoidal plate to deflect the gas bubble.
Figure 8:
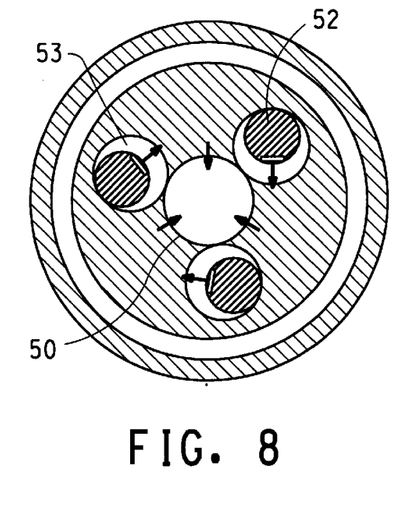
FIG. 8 is a cross-sectional view of the vertical reactor stage of FIG. 7 stacked on top of the vertical reactor stage of FIG. 6 as seen through lines VIII—VIII.

Another preferred arrangement is multiple downcomers 52 arranged in a triangular pattern, as illustrated in FIG. 7. The bottom of these downcomers 52 are truncated at an angle between 30 to 60 degrees with a welded extended ellipsoidal plate 53 to deflect the gas bubbles. Liquid is allowed to exit through a rectangular slit protected by the extended plate and pressure dissipating attachment. Slit dimensions are arranged to have a pressure drop of between 0.5 inches to 1.0 inch liquid to minimize backflow. The preferred arrangement of downcomers 49 and 52 with respect to each other is shown in FIG. 8 to achieve maximum mixing efficiency in the stage.

Preferably the reactor stages are configured as flooded trays to facilitate an agitator shaft to pass through the downcomers (not illustrated) to avoid sealing a rotating shaft against liquid. Typically, mechanical mixing is required at the bottom two or three stages of the reactor to minimize liquid by-pass. In these stages mixing induced by gas traffic (as implied by flow arrows in FIGS. 6 and 8) may not be sufficient to achieve the desired quality of mixing at higher viscosities encountered. Even though weir trays can be employed above agitated stages, flooded trays are still the choice allowing reactor level control to be achieved by measurement at the uppermost stage where it is most convenient.

Figure 5:
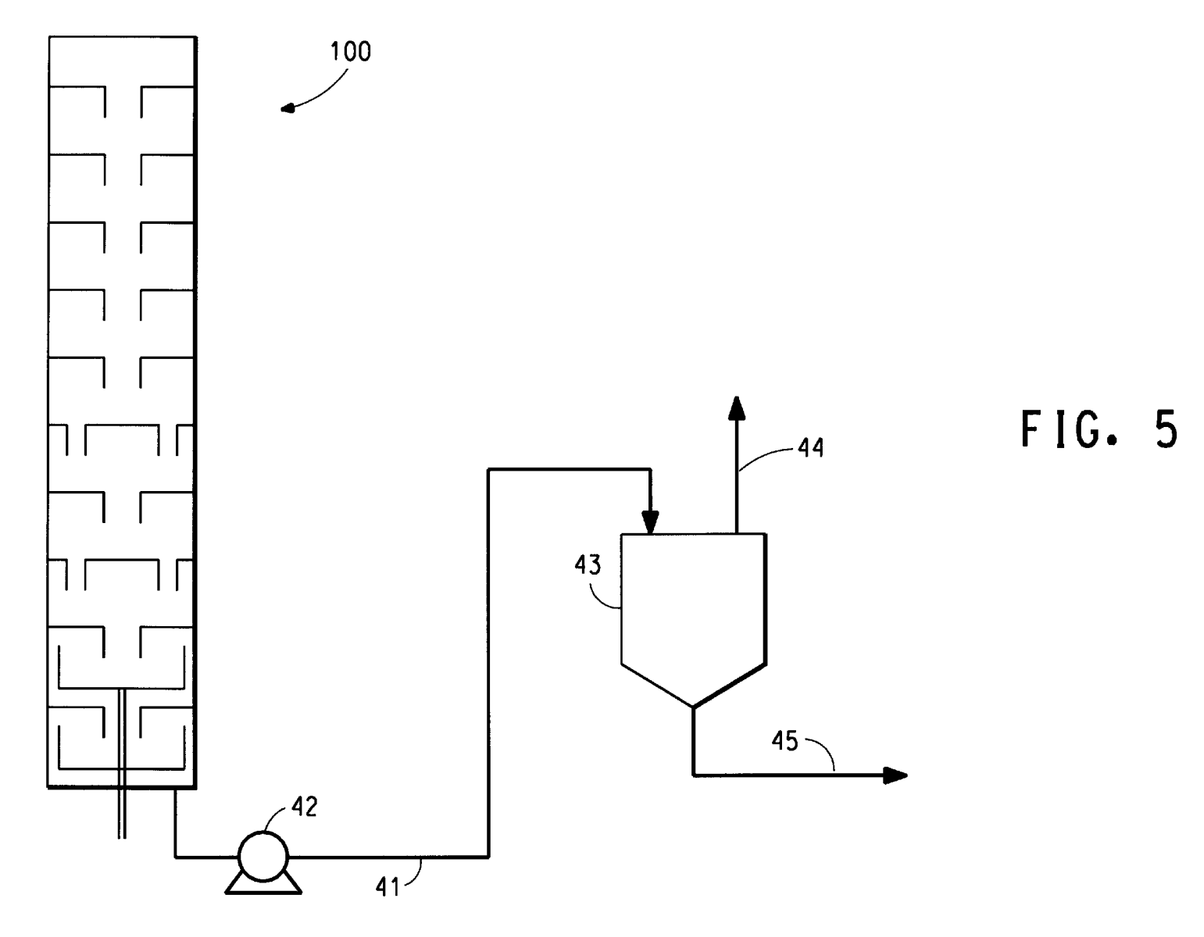
FIG. 5 schematically illustrates one preferred method of treating the product exiting the multistage reactor column such as to separate water vapor 44 from the liquid product stream 45.

The polyamide product 27 removed from the bottom of the column is generally a prepolymer having a number-average molecular weight of between about 3,000 and 8,000 and a relative viscosity (RV) between about 6 and 16, after adjustment for the presence of extractable components using the formula: $1.0-(RV_{adjusted})^{1/2}=\{1.0-(RV_{unextracted})^{1/2}\}/\{$weight fraction of non-extractables$\}$, where the weight fraction is measured at about 0.90 or the product made. The is product contains a content of dissolved water more or less proportional to the pressure of the column reactor. At typical pressures of operation, this moisture is enough to disrupt most methods of pelletization. Consequently, means are provided, following the column reactor, to reduce the pressure of the reaction mixture and thus to reduce the moisture content by volatilization. A preferred method, shown in FIG. 5, is to pass the mixture through a pipe 41 sized to bring about most of the reduction in pressure by means of frictional resistance to flow and provided with heating to compensate for the heat of vaporization. The pipe is usually preceded by a valve,or a pump 42 to control the flow rate. At the end of the pipe is a vessel 43 or a wider section of pipe, sized to allow almost complete separation of vapor 44 and liquid 45. This separation is carried out at a pressure low enough to at least reduce the water content to the level where the polymer can be pelletized. This pressure could be above atmospheric pressure. More typically the separator is operated at atmospheric pressure or under vacuum. The separator 43 is heated to maintain the polymer in the molten state and to establish an optimum temperature, typically between about 240° C. and 285° C., to accomplish further removal of dissolved moisture without causing undue degradation of the polymer. Separator 43 is preferably agitated to enhance further removal of dissolved moisture and to provide blending. The vapor 44 which contains ε-caprolactam and low molecular weight cyclic oligomers and steam can be recycled by recovering the ε-caprolactam using methods known in the art. The polyamide can be held in the separator to increase molecular weight of the prepolymer to values suitable for the desired end use, for example about 50 for apparel fiber and molding applications, about 60–70 for carpet fiber, and about 70 and higher for industrial fiber. Operating the separator under vacuum will further increase the molecular weight of the polyamide product. The polyamide product 45 removed from the separator can be pelletized using methods known in the art such as strand casting. If higher relative viscosity (RV) is desired, the pelletized polyamide product can be solid phase polymerized by heating the pellets in a flowing inert atmosphere such as nitrogen or in superheated steam, using methods known in the art.

Figure 4:
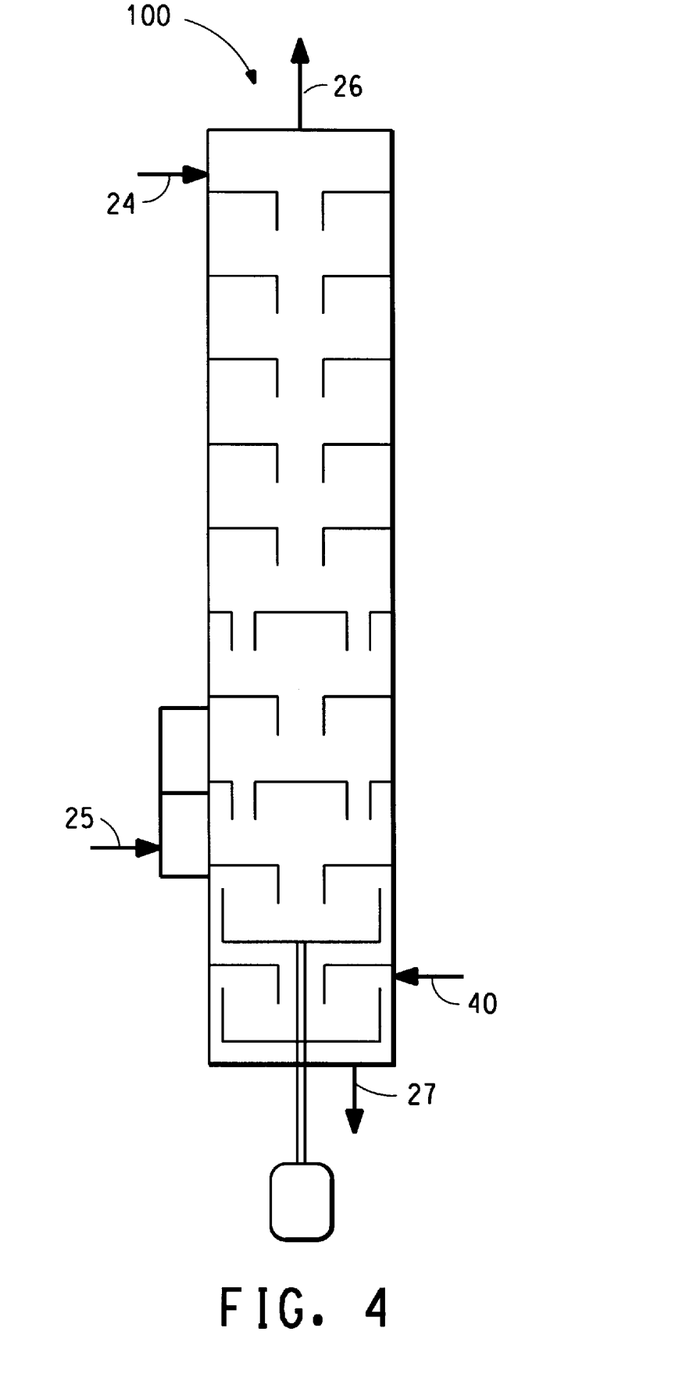
FIG. 4 is a schematic cross-sectional side-view of a vertical multistage reactor illustrating a method of reducing moisture content of the polymer product by supplying nitrogen 40 to the reactor column.

An alternative method of reducing the moisture content of the polymer, with the objective of making it pelletizable, is to supply nitrogen 40 to the column reactor at one or more locations below the bottom-most point of steam injection, as shown in FIG. 4.

The polyamide product will generally contain extractable compounds such as ε-caprolactam and low molecular weight cyclic oligomers which can be removed using known methods, such as water extraction.

The following examples are presented to more fully demonstrate and further illustrate various individual aspects and features of the present invention. As such the examples are felt to be non-limiting and are meant to illustrate the invention but are not meant to be unduly limiting in any way. The following further identifies the nature of the data presented.

Test Methods:

The polycaproamide (Nylon 6) prepared in the Examples was analyzed for amine and acid ends by the methods described on pages 293 and 294 in volume 17 of the "Encyclopedia of Industrial Chemical Analysis" published by John Wiley & Sons, Inc. in 1973. Nitrile ends were measured by infra-red absorption in the range of 2240–2245 $cm^{-1}$.

The relative viscosity (RV) of the polyamide samples was measured as the ratio of the viscosity of a solution of 8.4 wt % polymer in a solution of 90 wt % formic acid and 10 wt % water at 25° C., to the viscosity of the formic acid-water water solution, measured in the same units at 25° C.

The degree of linearity of the polyamide sample was determined by hydrolysis of the polymer with aqueous HCl followed by evaporation of the excess water and HCl. The dry residue was then reacted with a solution of N, N-dimethylformamide dimethylacetal, $(CH_3)_2 NCH(OCH_3)_2$, in methanol. As such, the iminobishexanoic acid, IBHA, degradation species resulting from the totally hydrolyzed secondary amine induced branch point in the otherwise linear polyamide is converted to the more volatile dimethyl ester of IBHA. The methylate derivatised degradation species are the quantitatively analyzed by gas chromatography. The frequency of branching in the polyamide sample is then reported in terms of gram equivalents of IBHA per million grams of sample.

EXAMPLE 1

A liquid mixture at approximately ambient room temperature, consisting of 90% by weight of 6-aminocapronitrile and 10% by weight of water and containing 0.1 weight percent phosphoric acid based on final polymer, was supplied continuously at a rate of approximately 40 pounds per hour to the top of an 8 inch diameter vertical reactor. The reactor was approximately 20 feet high. The reactor was divided into eleven stages, each stage separated from the stage above and below it by a horizontal perforated barrier. The barriers consisted of circular plates having a thickness of ⅛ to ⅜ inch, with between 6 to 16 holes of ⅛ inch diameter drilled on a hole-circles of diameters 4 and 6 inches for vapor passage, and fitted with one or three downcomers for liquid passage. The barriers were situated at intervals of 18 inches. All downcomers had a length of 8 inches, which resulted in them extending below the surface of the liquid in the stage below. In barriers with a single downcomer, the downcomer had an internal diameter of 2.25 inches and was centrally located. In barriers with three downcomers, the downcomers had an internal diameter of 1.5 inches and were located at 120 degrees (not accurately depicted in the figures) from each other on a circle of diameter 4 inches. All downcomers were fitted with deflectors at their bottom opening to minimize the by-passing of vapor through them. The alternation of barrier plates with a single downcomer and barrier plates with three downcomers was intended to better distribute liquid in the zones. The reactor temperature was controlled by manipulating the flow of heating oil to the heat-transfer surface in each zone so that a temperature gradient existed from the top to the bottom of the column, with the top stage held at 190° C. and the bottom stage at 284° C. Liquid flowing from the bottom stage was continuously removed from the bottom of the reactor.

Superheated steam at a temperature of 220–230° C. was supplied continuously into the upper part of each of the bottom three stages. The total amount of steam was about 43 pounds per hour distributed as follows: 5 lbs/hr to the top (vapor space) of stage 11, 15 lbs/hr to the top of stage 10, and 23 lb/hr to the top of stage 9. This vapor and any additional vapor volatilized from the liquid within the reactor flowed from each stage to the stage above through the multiplicity of small perforations in the barrier, thus bringing the vapor into intimate contact with the liquid in the stage above. Vapor flowing through the top stage flowed through a cooling device maintained at 185° C. to 190° C. which condensed part of the vapor and continuously returned it to the top stage. The uncondensed vapor was continuously removed from the top of the reactor. The rate of vapor removal was continuously adjusted to maintain a pressure of 130 pounds per square inch gage within the vessel. The liquid leaving the bottom of the vessel was analyzed and found to have a carboxyl end content of approximately 125 gram equivalents per million grams of sample, an amine end content of 99 to 101, and a relative viscosity of approximately 13.5 measured on the unextracted polymer.

The liquid from the bottom of the reactor was continuously pumped through a pipe in which the pressure decreased to zero pounds per square inch gage due to the frictional resistance to flow. The pipe was heated by heating oil in a surrounding jacket. The pipe issued into an agitated vessel held at 275–280° C. from which vapor could freely escape and which was maintained at a pressure of zero pounds per square inch gage. The reaction mixture in this vessel was continuously removed, at a rate approximately equal to the inflow. The average residence time of the liquid in the vessel was between 15 and 30 minutes. The liquid leaving the vessel was analyzed and found to have a steady nitrile end content of between zero and 16 gram equivalents per million grams of sample and 4.9 gram equivalents IBHA per million grams of sample.

EXAMPLE 2

A liquid mixture at approximately ambient room temperature, consisting of 90% by weight of 6-aminocapronitrile and 10% by weight of water and containing 0.1% by weight of phosphoric acid was supplied continuously at a rate of approximately 56 pounds per hour to the top stage of the reactor described in Example 1. Reactor temperature was controlled so that the top stage was at 210° C. and the bottom stage at 278° C. Saturated steam at 220–230° C. was supplied continuously into the upper part of each of the bottom four stages at a total rate of about 51 pounds per hour. The pressure in the vessel was maintained at 250 pounds per square inch gage. The liquid leaving the bottom of the vessel was analyzed and found to have a carboxyl content of approximately 206 gram equivalents per million grams of sample, an amine end content of approximately 196, and a relative viscosity of approximately 7.2 measured on the unextracted polymer. The liquid was continuously passed through a pipe and vessel at zero pounds per square inch gage as described in Example 1 and the liquid leaving the vessel was analyzed and found to have a nitrile end content of between zero and 14 gram equivalents per million grams of sample and 4.6 gram equivalents of IBHA per million grams of sample.

EXAMPLE 3

A liquid mixture at approximately ambient room temperature, consisting of 90% by weight of 6-aminocapronitrile and 10% by weight of water and containing 0.1% by weight of phosphoric acid was supplied continuously at a rate of approximately 37 pounds per hour to the top stage of the reactor described in Example 1. Reactor temperature was controlled so that the top stage was at 213° C. and the bottom stage at 281° C. Saturated steam at 220–230° C. was supplied continuously into the upper part of each of the three stages immediately above the bottom stage at a total rate of about 54 pounds per hour. The pressure in the vessel was maintained at 250 pounds per square inch gage. Nitrogen was supplied continuously to the top of the bottom stage at a rate of 12 pounds per hour. The liquid leaving the bottom of the vessel was analyzed and found to have a carboxyl content of approximately 86 gram equivalents per million grams of sample, 4.3 gram equivalents IBHA per million grams of sample, an amine end content of approximately 71 gram equivalents per million grams of sample, a nitrile end content between 0 and 14 gram equivalents per million grams of sample, and a relative viscosity of approximately 18.1 measured on the unextracted polymer. The analytical results indicated that the nitrogen was effective in removing moisture from the polymer in the bottom stages. It was not found possible to continuously extrude the polymer from the reactor in the form of uninterrupted strands as required for the pelletization process in use.

EXAMPLE 4

A liquid mixture at approximately ambient room temperature, consisting of 90% by weight of 6-aminocapronitrile and 10% by weight of water in the absence of catalyst, was supplied continuously at a rate of approximately 40 pounds per hour to the top stage of the reactor described in Example 1. Reactor temperature was controlled so that the top stage was at 236° C. and the bottom stage at 284° C. Saturated steam at 240° C. was supplied continuously into the upper part of each of the bottom four stages at a total rate of about 45 pounds per hour. The pressure in the vessel was maintained at 400 pounds per square inch gage. The liquid leaving the bottom of the vessel was analyzed and found to have a carboxyl content of approximately 266 gram equivalents per million grams of sample, an amine end content of approximately 300 gram equivalents per million grams of sample, and a relative viscosity of approximately 5.1 measured on the unextracted polymer. The liquid was continuously passed through a pipe and vessel at zero pounds per square inch gage, as described in Example 1. and the liquid leaving the vessel was analyzed and found to have a nitrile end content of between zero and 14 gram equivalents per million grams of sample.

Having thus described and exemplified the invention with a certain degree of particularity, it should be appreciated that the following claims are not to be so limited but are to be afforded a scope commensurate with the wording of each element of the claim and equivalents thereof.

We claim:

1. A continuous process for the manufacture of polyamide from omega-aminoitrile comprising the steps of:
   a) providing a vertical countercurrent multistage reactor, said reactor being equipped with internal perforated barrier means for establishing a plurality of stages and for effecting contact of countercurrently flowing omega-aminonitrile stream and steam vapor stream;
   b) introducing an omega-aminonitrile reactant stream near the top of said vertical countercurrent multistage reactor;
   c) introducing a steam vapor containing stream near the bottom of said vertical countercurrent multistage reactor;
   d) maintaining the temperatures and the pressure within said vertical countercurrent multistage reactor from 190° C. to 290° C. and 50 psig to 800 psi to achieve hydrolysis of the omega-aminonitrile in the upper stages of the reactor and simultaneously to achieve polymerization in the lower stages of the reactor;
   e) withdrawing a steam and ammonia containing stream overhead of said vertical countercurrent multistage reactor; and
   f) recovering a polyamide containing product stream from the bottom of said vertical countercurrent multistage reactor, wherein said polyamide has unreacted nitrile end groups of less than 20 gram equivalents per million grams of polyamide.

2. A process of claim 1 wherein said polyamide being recovered contains less than 25 gram equivalents of secondary amine branching per million grams of polyamide.

3. A process of claim 2 wherein the temperature of at least one top stage of said reactor is maintained between 230 to 250° C., the temperature of at least one bottom stage of said reactor is maintained between 260 to 290° C. and the pressure is maintained between 400 and 800 psig and the hydrolysis of the omega-aminonitrile and the polymerization is performed in the absence of catalyst.

4. A process of claim 1 wherein the temperature of at least one top stage of said reactor is maintained between 190 to 220° C., the temperature of at least one bottom stage of said reactor is maintained between 260 to 290° C. and the pressure is maintained between 100 and 300 psig and the hydrolysis of the omega-aminonitrile and the polymerization is performed in the presence of catalyst and wherein polymeric linearity of said polyamide being recovered is further characterized as containing less than 10 gram equivalents of secondary amine branching per million grams of polyamide.

5. A process of claim 3 wherein the omega-aminonitrile is 6-aminocapronitrle and the polyamide is nylon 6.

6. A process of claim 4 wherein the omega-aminonitrile is 6-aminocapronitrle and the polyamide is nylon 6.

* * * * *